(12) United States Patent
Lockyer

(10) Patent No.: US 12,567,091 B2
(45) Date of Patent: Mar. 3, 2026

(54) DIGITAL IMAGE MANAGEMENT OF DRILL CUTTINGS IMAGES

(71) Applicant: Schlumberger Technology Corporation, Sugar Land, TX (US)

(72) Inventor: Daniel Lockyer, Croissy sur Siene (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 82 days.

(21) Appl. No.: 18/678,900

(22) Filed: May 30, 2024

(65) Prior Publication Data

US 2025/0371589 A1 Dec. 4, 2025

(51) Int. Cl.
*G06Q 30/04* (2012.01)
*G06F 16/23* (2019.01)
*G06Q 20/42* (2012.01)

(52) U.S. Cl.
CPC ......... *G06Q 30/04* (2013.01); *G06F 16/2379* (2019.01); *G06Q 20/42* (2013.01)

(58) Field of Classification Search
CPC ..... G06Q 30/04; G06Q 20/42; G06F 16/2379
See application file for complete search history.

(56) References Cited

U.S. PATENT DOCUMENTS

| | | | |
|---|---|---|---|
| 11,443,149 B2 * | 9/2022 | Francois | G01N 21/255 |
| 2015/0186855 A1 * | 7/2015 | Bennett | G06Q 20/102 |
| | | | 705/40 |
| 2015/0379510 A1 * | 12/2015 | Smith | G06F 21/64 |
| | | | 705/71 |
| 2016/0098703 A1 * | 4/2016 | Belchee | G06V 30/224 |
| | | | 705/39 |
| 2021/0192520 A1 * | 6/2021 | Patel | G06Q 20/02 |
| 2021/0256070 A1 * | 8/2021 | Tran | G06F 16/9536 |
| 2021/0350429 A1 * | 11/2021 | Gangadarappa | G06Q 30/04 |
| 2022/0023742 A1 * | 1/2022 | Tran | A63F 11/00 |
| 2022/0270146 A1 * | 8/2022 | Diedrich | H04L 9/3236 |
| 2024/0046230 A1 * | 2/2024 | Vijayaraghavan | G06F 40/194 |

FOREIGN PATENT DOCUMENTS

WO 2023230101 A1 11/2023

OTHER PUBLICATIONS

"Smart Contract," Wikipedia, 2024, 12 pages.

* cited by examiner

*Primary Examiner* — Michael Jared Walker
(74) *Attorney, Agent, or Firm* — Kyle R. Miiller

(57) ABSTRACT

A system for managing and tracking digital images of drill cuttings includes at least one networked database configured to store the digital images. A supplier portal is configured to enable a supplier to upload the digital images into the database and a customer portal is configured to provide customer access to selected ones of the digital images in the database. A networked blockchain ledger is in communication with the database, the supplier portal, and the customer portal. The blockchain ledger is configured to initiate a smart chain contract for each of the digital images, record customer access events within each smart chain contract for each of the digital images, and create a micro invoice including charges related to the recorded customer access events.

20 Claims, 8 Drawing Sheets

DIGITAL IMAGE MANAGEMENT OF DRILL CUTTINGS IMAGES

CROSS REFERENCE TO RELATED APPLICATIONS

None.

BACKGROUND

In subterranean drilling operations, such as for oil and gas exploration and production, formation cuttings are generated by the drilling activity. These cuttings have long been evaluated and characterized to better understand the properties and structure of subsurface rock. The cuttings are commonly collected after passing the shale shakers, then cleaned and photographed for analysis (e.g., using artificial intelligence algorithms).

In recent years, calibrated image acquisition routines have been developed to promote particle to particle consistency within an image and image to image consistency over the duration of a drilling operation (or even from one drilling operation to the next). The acquired images may be inspected manually by trained personnel and/or may be processed automatically to extract detailed color, shape, size, and texture features from multiple individual particles in the image. The extracted features may be further evaluated using artificial intelligence (AI) routines to interpret various formation properties such as formation lithology and porosity.

While digital image acquisition and processing of drill cuttings has advanced formation evaluation, the sheer number of digital images generated is proving to be problematic. For example, the acquired images are commonly viewed, copied, transferred, processed, and sometimes edited and/or enhanced after creation. Owing to the large number of images generated daily (e.g., up to thousands of generated images per well drilling operation) these activities cannot be manually tracked. Nor can the images be manually inventoried with a definitive confirmation of their integrity. There is a need in the industry to automatically track these activities and further to automatically confirm that the image (and the metadata associated with the image) match the originally generated image. There is a further need to provide automated inventory confirmation and customer invoicing based on the tracked activities.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Embodiments of this disclosure include systems and methods configured to manage and track digital images of drill cuttings acquired during subterranean drilling operations. One example system includes at least one networked database configured to store the digital images. A supplier portal is configured to enable a supplier to upload the digital images into the database and a customer portal is configured to provide customer access to selected ones of the digital images in the database. A networked blockchain ledger is in communication with the database, the supplier portal, and the customer portal. The blockchain ledger is configured to initiate a smart chain contract for each of the digital images, record customer access events within each smart chain contract for each of the digital images, and create a micro invoice including charges related to the recorded customer access events.

Figure 1:
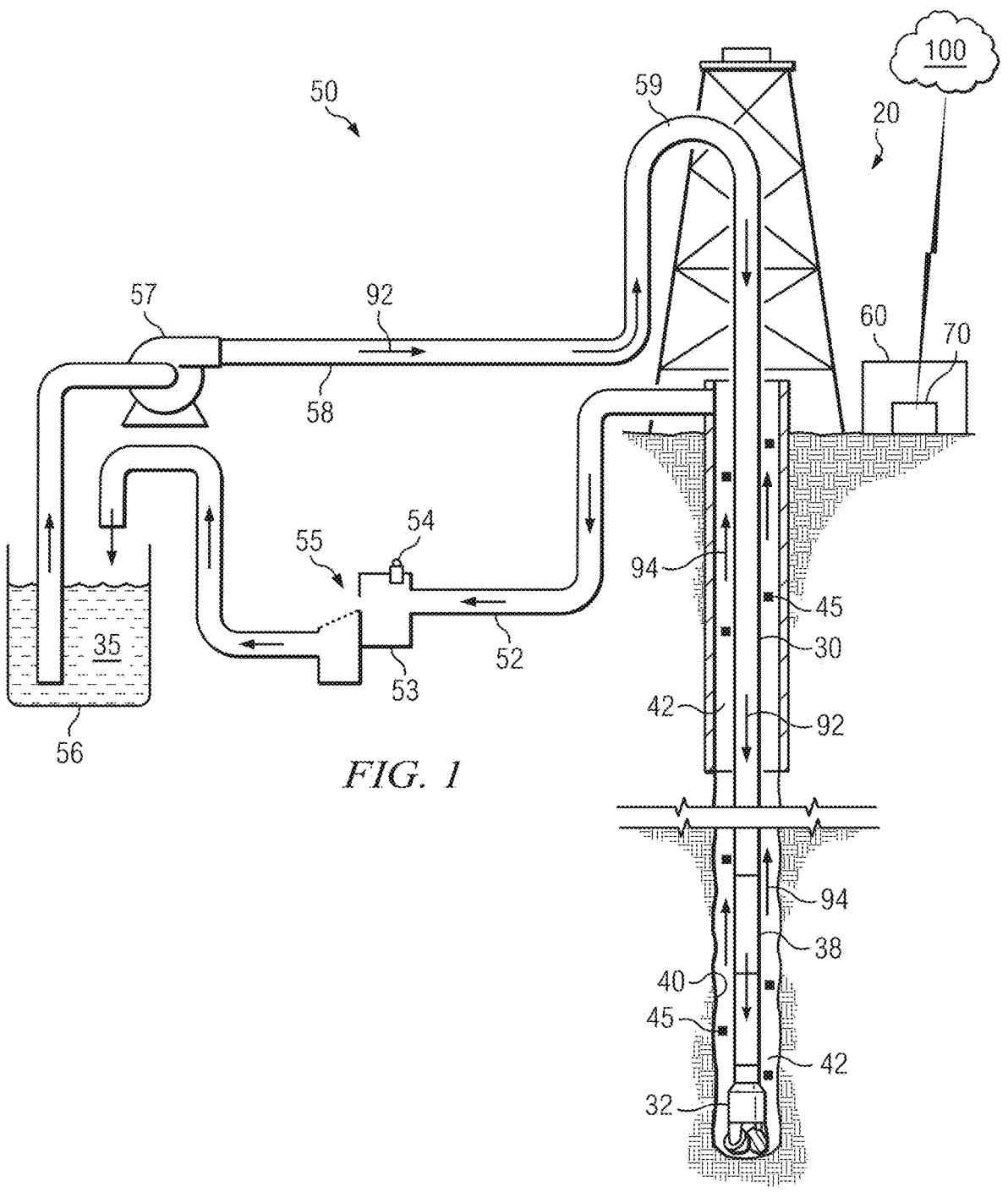
FIG. 1 depicts an example drilling rig including a digital acquisition system for acquiring digital images of drill cuttings and an image management system for managing the acquired cuttings images.

FIG. 1 depicts an example drilling rig 20 including a digital acquisition system 70 for acquiring digital images of drill cuttings and an image management system 100 for managing the acquired cuttings images. The drilling rig 20 may be positioned over a subterranean formation (not shown). The rig 20 may include, for example, a derrick and a hoisting apparatus (also not shown) for raising and lowering a drill string 30, which, as shown, extends into wellbore 40 and includes, for example, a drill bit 32 and one or more downhole measurement tools 38 (e.g., a logging while drilling tool or a measurement while drilling tool) in a bottom hole assembly (BHA) above the bit 32. Suitable drilling systems, for example, including drilling, steering, logging, and other downhole tools are well known in the art.

Drilling rig 20 further includes a surface system 50 for controlling the flow of drilling fluid used on the rig (e.g., used in drilling the wellbore 40). In the example rig depicted, drilling fluid 35 is pumped downhole (as depicted at 92), for example, via a conventional mud pump 57. The drilling fluid 35 may be pumped, for example, through a standpipe 58 and mud hose 59 in route to the drill string 30. The drilling fluid 35 typically emerges from the drill string 30 at or near the drill bit 32 and creates an upward flow 94 of mud through the wellbore annulus 42 (the annular space between the drill string and the wellbore wall). The drilling fluid 35 then flows through a return conduit 52 to a mud pit system 56 where it may be recirculated. It will be appreciated that the terms drilling fluid and mud are used synonymously herein.

The circulating drilling fluid 35 is intended to perform many functions during a drilling operation, one of which is to carry drill cuttings 45 to the surface (in upward flow 94). The drill cuttings 45 are commonly removed from the returning mud via a shale shaker 55 (or other similar solids control equipment) in the return conduit (e.g., immediately upstream of the mud pits 56). Formation gases that are released during drilling may also be carried to the surface in the circulating drilling fluid. These gases are commonly removed from the fluid, for example, via a degasser or gas trap 54 located in or near a header tank 53 that is immediately upstream of the shale shaker 55 in the example depiction. The drill cuttings 45 may be examined to evaluate properties of the subterranean formation layers through which the wellbore is drilled as described in more detail below.

The rig 20 may include a system 70 configured to take digital images of the drill cuttings and to optionally evaluate the images to estimate various formation characteristics. The system 70 may be deployed at the rig site (e.g., in an onsite laboratory 60) or offsite. The disclosed embodiments are not limited in this regard. The system 70 may include a digital camera and a corresponding lens deployed above a sample holder and configured to take a digital photograph of the cuttings sample. The system may include one or more light sources, for example, including a white light source and/or an ultraviolet light source configured to illuminate the sample holder. The image acquisition system 70 may further include an electronic controller configured to control operation of the camera, lens, and/or lights. The controller may include one or more processors (e.g., microprocessors) which may be connected to one or more data storage devices (e.g., hard drives or solid state memory). The controller may be configured to network (e.g., communicate) with external devices, for example, via a hard wire or wireless connection. For example, the controller may be configured to upload acquired images to a local (rig-site) network and/or to an internet based or remote network via system 100.

While FIG. 1 depicts a land rig 20, it will be appreciated that the disclosed embodiments are equally well suited for land rigs or offshore rigs. As is known to those of ordinary skill, offshore rigs commonly include a platform deployed atop a riser that extends from the sea floor to the surface. The drill string extends downward from the platform, through the riser, and into the wellbore through a blowout preventer (BOP) located on the sea floor. The disclosed embodiments are not limited in these regards.

Figures 2, 3, 4:
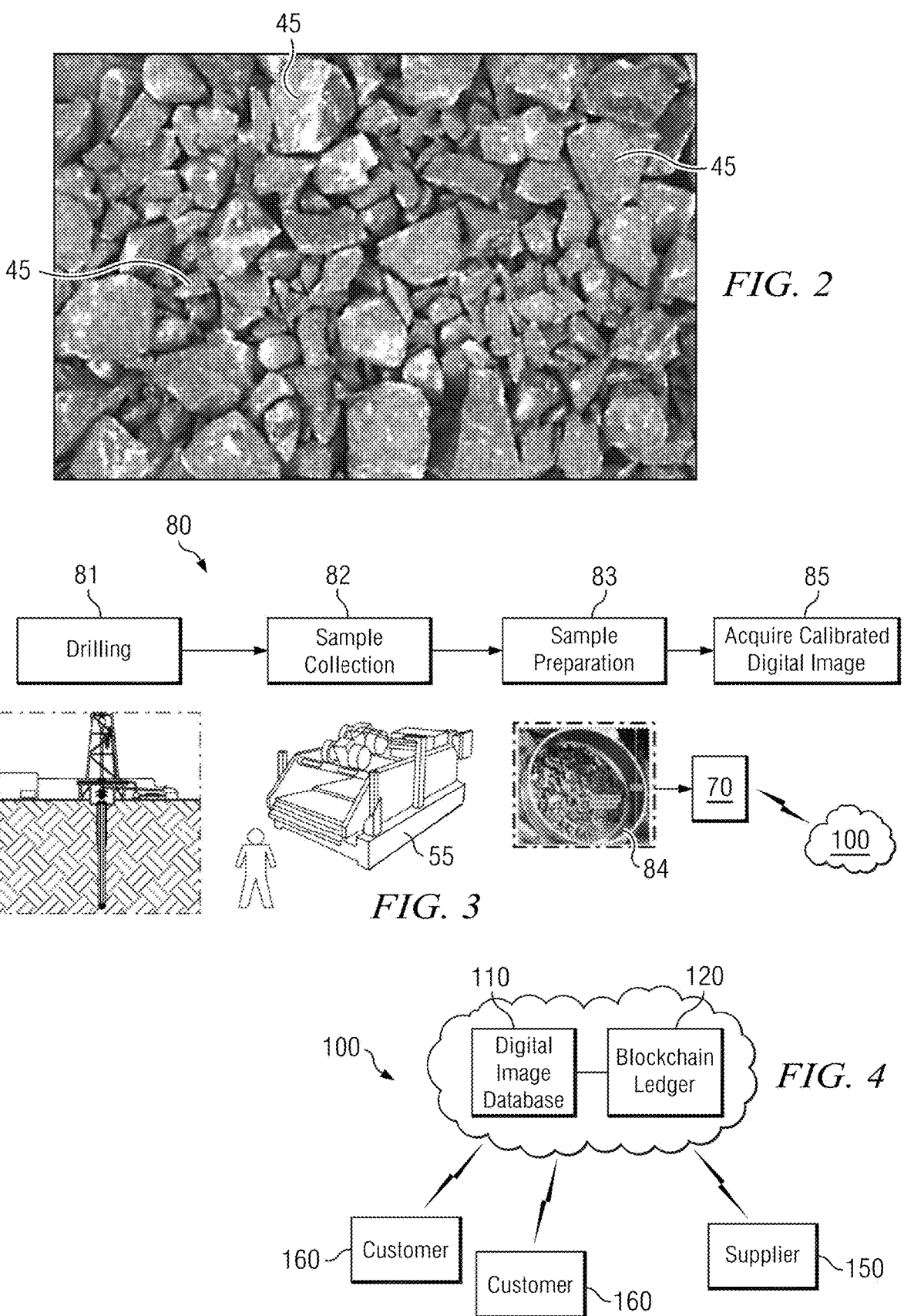
FIG. 2 depicts an example digital image of cuttings particles obtained during a downhole drilling operation.
FIG. 3 depicts an example method for acquiring a calibrated digital image of a drill cuttings sample.
FIG. 4 depicts a block diagram of an example blockchain-based digital image management system.

FIG. 2 depicts an example digital white light image of cuttings particles obtained during a downhole drilling operation. The depicted image includes a large number of cuttings particles 45 placed on a tray. It has long been recognized that formation rock cuttings particles generated during drilling are abundant in volume and number and may potentially provide one of the most abundant and lowest cost data sources for understanding and characterizing the subsurface formation(s). In recent years there has been considerable interest in developing methods that make use of machine learning (e.g., artificial intelligence and neural network processing) to evaluate the cuttings particles (such as those depicted in FIG. 2).

For example, methods have been disclosed to classify formation lithology from digital images of cuttings particles. Such methods may include acquiring a calibrated digital image of the cuttings particles, segmenting the image to identify individual particles in the image, extracting geometry (e.g., size and shape), color, and/or texture features from the individual particles, and processing the extracted features to classify the lithology of the formation from which the cuttings were obtained.

It will be appreciated that segmentation and subsequent feature extraction may be highly influenced by the quality and consistency of the acquired digital image. For example, a blurry image or improper lighting and contrast may significantly increase the difficulty in identifying individual particles during segmentation and/or extracting features from identified individual particles (particularly texture related features). Likewise, image editing, such as enhancement techniques to adjust balance, brightness, or contrast can compromise the value of an image for training AI models.

Turning now to FIG. 3, an example method 80 for obtaining a calibrated digital image of a drill cuttings sample is depicted. A borehole is drilled at 81, for example, using the rig equipment described above with respect to FIG. 1. The drilling operation generates cuttings 45 that are collected at 82, for example, from a shale shaker 55, as also described with respect to FIG. 1. In example embodiments, the cuttings may be prepared for analysis at 83, for example, by washing in water or other solvents, drying in an oven, and/or sieving or meshing the cuttings (e.g., as shown at 84) to remove large or small particles. A sample of the prepared cuttings may then be placed in a digital image acquisition system 70 and a calibrated digital image may be manually or automatically acquired at 85. The calibrated cuttings image may include a white light image in which the cuttings are illuminated with white light, an ultraviolet image in which the cuttings are illuminated with ultraviolet light, and/or a composite image in which the cuttings are illuminated with both white light and ultraviolet light. The disclosed embodiments are not limited in this regard. The acquired images may then be transferred to system 100 for storage and management.

The acquired and stored images may be evaluated by both supplier personnel (e.g., personnel that are employed or otherwise affiliated with the oilfield service provider) or customer personnel (e.g., personnel that are employed or otherwise affiliated with the customer). It will be appreciated that the interactions between supplier and customer personnel and the oil and gas supplier customer contracts can be complex, with lengthy contracts and agreements. Moreover, digital image acquisition and image processing are also complex activities, particularly given the large number of images generated for each drilled well in the potentially large number of wells under contract between a customer and supplier. There is a need in the industry to automatically track and manage digital image acquisition, sharing, editing, and processing activities. There is a further need to provide automated inventory confirmation and customer invoicing based on the tracked activities.

Consistent with the trends in many other industries, the oil and gas industry is increasingly relying on cloud-based solutions for supporting exploration, production, and other aspects of the oil and gas business. Furthermore, collaborative solutions are increasingly used to enable multiple individuals in the same organization or across different organizations to access and otherwise work with the same data (such as digital images), as well as perform various tasks using that data. For example, as described above, cuttings images are commonly evaluated to infer characteristics of the subterranean formations penetrated by the wellbore. In the early phase of development of an oil field, the number of images may be modest (e.g., a few thousand per well for several exploratory wells). The images may generally be examined by scientists that are modeling the hydrocarbon potential of the field. As the field is developed, the number of images may vastly increase with the increasing number of wells. Moreover, the images may be examined by other entities such as production and recovery personnel. As a supplier and/or customer develop additional fields, the number of images can become very large (e.g., into the millions of images) and the personnel accessing the images can increase still further.

In the disclosed embodiments, a cloud-based digital image management (DIM) collaboration platform may be used throughout the various phases associated with the development and production of an oil field and across multiple fields. Within this collaboration platform, contracting may play a central role in the platform, and effectively guide access of the digital images to various users of the platform. Moreover, in the disclosed embodiments, contracts may be extended or modified from time to time, and tracking may be used to keep track of every updates on all images. Such a collaboration platform may also support collaboration between different collections of entities, while still maintaining separation between the different collections of entities.

In the disclosed embodiments, the tracking may be performed using a distributed database that maintains a continuously growing list (a blockchain ledger) of ordered contracts (e.g., one smart contract per image), where each contract is referred to as a block. Any new contract may be considered as a new block, with every block containing a hash of the previous block in the blockchain, with its own hash calculated from the previous hash. Thus, if an entity tries to change a contract, then the hash of that block will change, resulting in a change of the hashes of all the following blocks, and thereby resulting in an invalid blockchain. The validation (by a program) of the blockchain may be performed by each participating node, thereby facilitating detection of any tampering of data.

The disclosed embodiments may also leverage a distributed infrastructure, referred to herein as a blockchain-based image management service, to enable contract (and image) management as well as image authentication and authorization, thereby reducing additional infrastructure cost and time to implement. In the disclosed embodiments, for example, contract management may not only manage and secure contracts but also enable "If-Then" premises, e.g., if a user's contract is not expired then allow access to the data. Notifications of unwanted or unauthorized activities may also be enabled in some embodiments.

In some embodiments, for example, a blockchain-based management service consistent with the disclosed embodiments may be implemented in part using an application software development kit (SDK) and server-side service that validate whether an application user has access to a particular record/resource/data as per a contract. In some embodiments, the service may leverage a standardized blockchain technology framework, e.g., the Hyperledger Fabric framework available through the Linux Foundation or another suitable framework, to create and execute digital contracts. In some embodiments, such a standardized framework may be customized for creating and executing digital contracts within a cloud-based DIM system and for integrating with existing oil and gas-related services within the system. A standardized framework may be extended and leveraged to manage the authorization and authentication of the peer nodes involved.

FIG. 4 depicts a block diagram of an example blockchain-based digital image management system 100. Although not explicitly depicted on FIG. 4, it will be appreciated that the system 100 may be implemented utilizing a plurality of peer nodes that are accessible by a plurality of clients through one or more networks. A blockchain framework, such as a blockchain framework based upon the Hyperledger Fabric framework, may be resident in each peer node to maintain and execute digital contracts.

With continued reference to FIG. 4, the digital image management system 100 includes a networked digital image storage module 110 configured for short term and/or long term storage of the acquired digital cuttings images (e.g., the acquired white light, ultraviolet, and/or composite images). The storage module may be centralized at a single network location or may be decentralized and include a plurality of modules located at multiple locations. The disclosed embodiments are not limited in this regard. The system further includes a blockchain ledger 120 that includes a listing of selected image related transactions that document the full life-cycle of each image, including, for example, image creation, image storage, image access by a customer, image downloads, image modifications, micro invoices related to the image and its use, and so on. As described in more detail below, the blockchain ledger 120 may be configured to initiate a unique smart chain contract at the creation of each image.

With still further reference to FIG. 4, the digital image management system 100 further includes an oilfield services supplier portal 150 configured to enable one or more supplier entities to upload new images to the system 100. The portal 150 may include applications software, for example, that enables rig personnel (e.g., one or more supplier entities) to upload images into the storage module 110 via a local networked computer. The supplier portal 150 may be configured to enable multiple supplier entities, for example, located at multiple drilling sites to upload images into the storage module 110. The digital image management system 100 further includes one or more customer portals 160 configured to enable various customer personnel to access images in the storage module 110. The customer portal 160 may include applications software, for example, that enables customer personnel (e.g., one or more customer entities) to view or download images from the storage module 110 via a local networked computer. The customer portal 160 may be configured to enable multiple customer entities, for example, located at multiple locations to access the images in the storage module 110.

Figure 5:
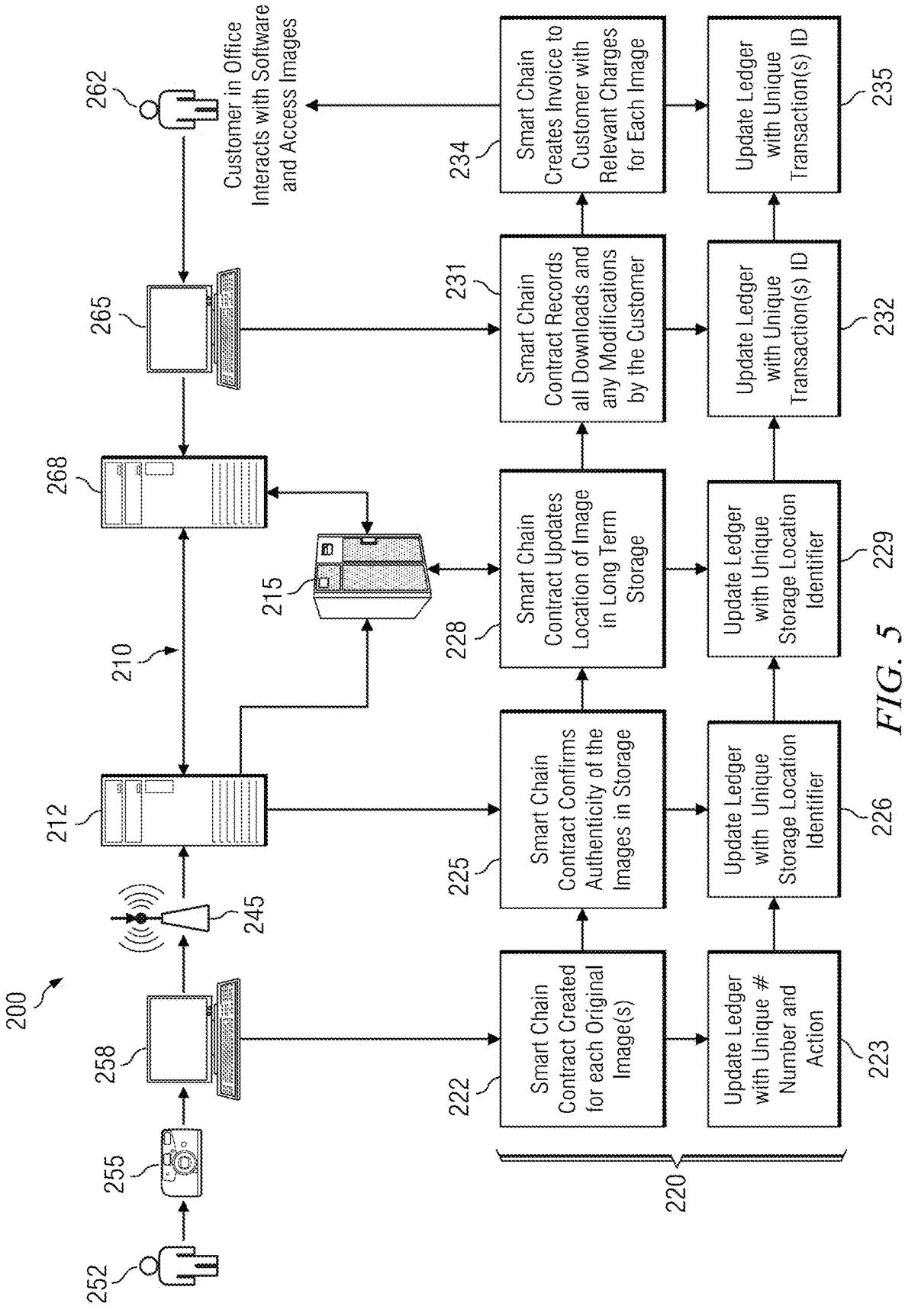
FIG. 5 depicts a block diagram of another example blockchain-based digital image management system.

FIG. 5 depicts a block diagram of another example blockchain-based digital image management system 200. System 200 is similar to system 100 in that it includes a storage module 210 and a block chain ledger module 220. As further depicted, supplier personnel 252 at a rig site may record digital images using a digital image acquisition system 255 (such as that described above with respect to FIGS. 1-3). The acquired images may be stored locally at 258, for example, on a laptop connected to the digital image acquisition system at the rig site. Upon storing the image, a smart chain contract may be initiated and a unique token created at 222 in the block chain ledger module at 220. The ledger may be further updated with a unique hash (#) number and action at 223.

The digitized image may then be transferred (uploaded) 245 to cloud-based short-term storage 212. The smart chain ledger module 220 may confirm the original authenticity of the image in short-term storage in the smart chain contract at 225 and update the ledger with a unique storage location identifier at 226. Depending on the contract terms with the customer, the image may be further transferred to long-term storage at 215 and the smart chain contract may update the location of the original image in long-term storage at 228 and again update the ledger with a unique storage location identifier at 229. It will be appreciated that the depiction is simplified in that it shows only a single user 252. In practice the system 200 may enable multiple supplier personnel 252 (e.g., located at the same rig site or multiple different rig sites) to upload digital images to the system 200. In such practical embodiments the blockchain ledger 220 may be configured to initiate a smart chain contract for each image, confirm the authenticity of the images, and update the ledger with the unique storage location of each image as described above.

With continued reference to FIG. 5, customer personnel 262 may access selected images in the storage module 210 via frontend hardware and software 265 coupled to a networked digital cuttings application 268. Upon such access, the smart chain contract records each access event (e.g., a high or low resolution download of the image) and any modifications made to the images by the customer at 231 and further updates the ledger with unique transaction identifiers (IDs) at 232. Moreover, the smart chain may create a micro invoice to the customer including various charges depending on what micro transactions have occurred with each image at 234 and again updates the ledger with unique transaction IDs at 235. For example, as described in more detail below, the customer may be invoiced for each image download. The customer may be further invoiced for downloading interpretive data pertaining to corresponding images (e.g., including automated lithology reports). The customer may be further invoiced for implementing networked image modification tools and for saving modified images to storage. Note again that all such customer actions necessitate that corresponding smart chain contract records be created at 231, 232, 234, 235 in the block chain ledger module 220.

Figure 6:
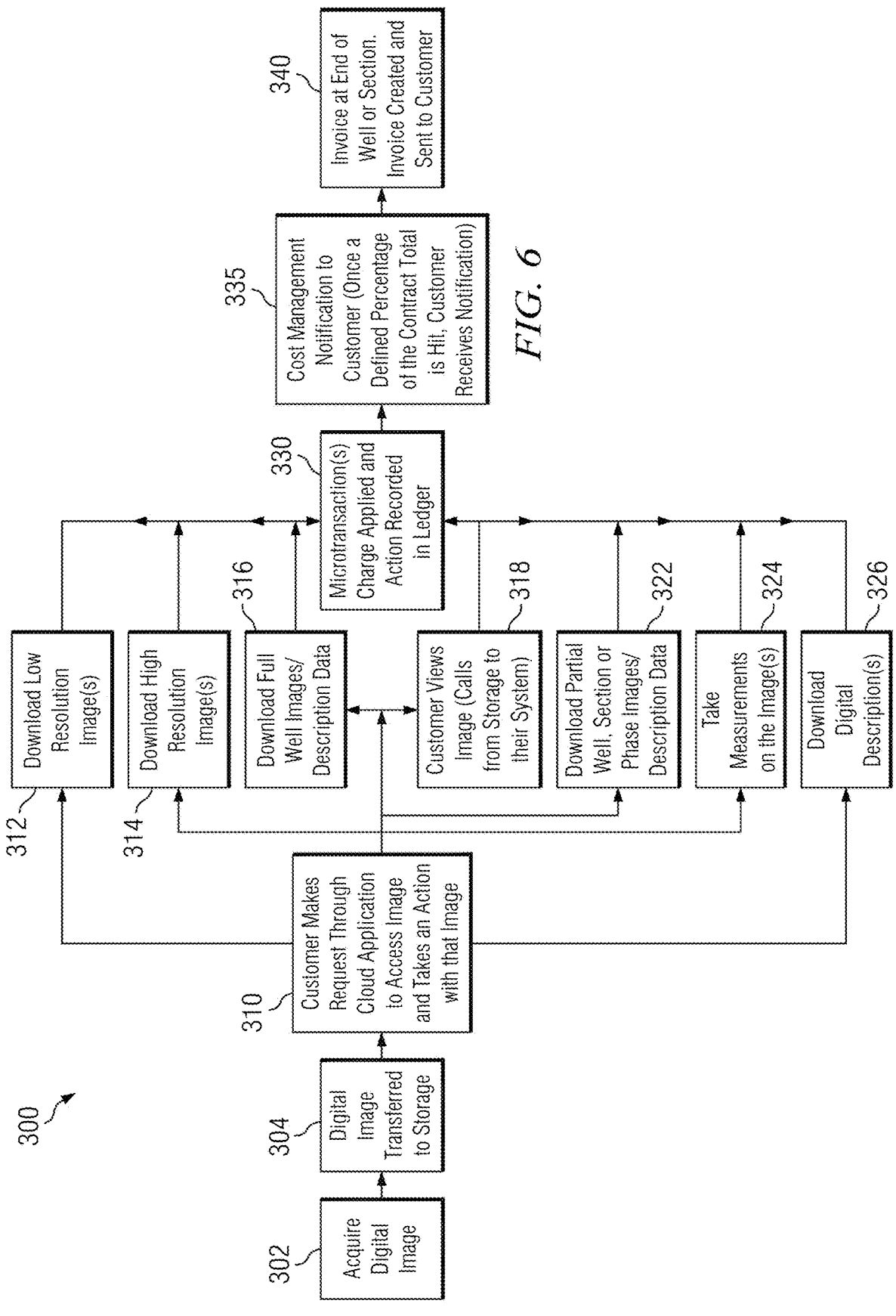
FIG. 6 depicts a micro transaction flow diagram that may be executed by the system of FIG. 5.

Turning now to FIG. 6, a microtransaction block/flow diagram 300 is depicted. A digital cuttings image may be captured (recorded) and uploaded to short term and/or long term storage at 302 and 304, for example, as described above with respect to FIG. 5. A customer may make a request through a networked digital cuttings application at 310 to access the image and to take some action with respect to that image (or with respect to multiple images in storage). Such actions may include, for example, downloading a low resolution image(s) at 312, downloading a high resolution image (s) at 314, downloading a set of images and/or image descriptions from a full well at 316, customer image viewings from short term or long term storage at 318, downloading a set of images and/or image descriptions from a partial well or well section at 322, making measurements on the image(s) at 324, for example, using image measurement tools in the digital cuttings application, and/or downloading digital description(s) or interpretation(s) of the image(s) at 326. Each of the micro transactions (for each image) may be recorded in the block chain ledger (in the corresponding smart chain contracts for each image) at 330. Corresponding charges to be invoiced may also be recorded at 330. Cost management notification may be given to the customer, for example, when a predesignated or agreed upon percentage of a contract total is reached at 335. Such notification may also be given at multiple percentages, for example, at 50%, 80%, and 90% to enable customer cost control and management. Micro invoices may be created and sent to the customer at 340.

Turning now to FIGS. 7A, 7B, 7C, and 7D (collectively FIG. 7), example workflows 400, 450, 500, and 550 for digital image acquisition and transfer (7A), digital image customer access (7B), digital image sale or liquidation (7C), and digital image micro invoicing (7D). In each workflow depicted on FIG. 7, the digital image management system (e.g., system 100 or 200) is configured to execute and settle a contract and records events and outcomes in the block chain ledger for each of the acquired digital cuttings images.

Figure 7A:
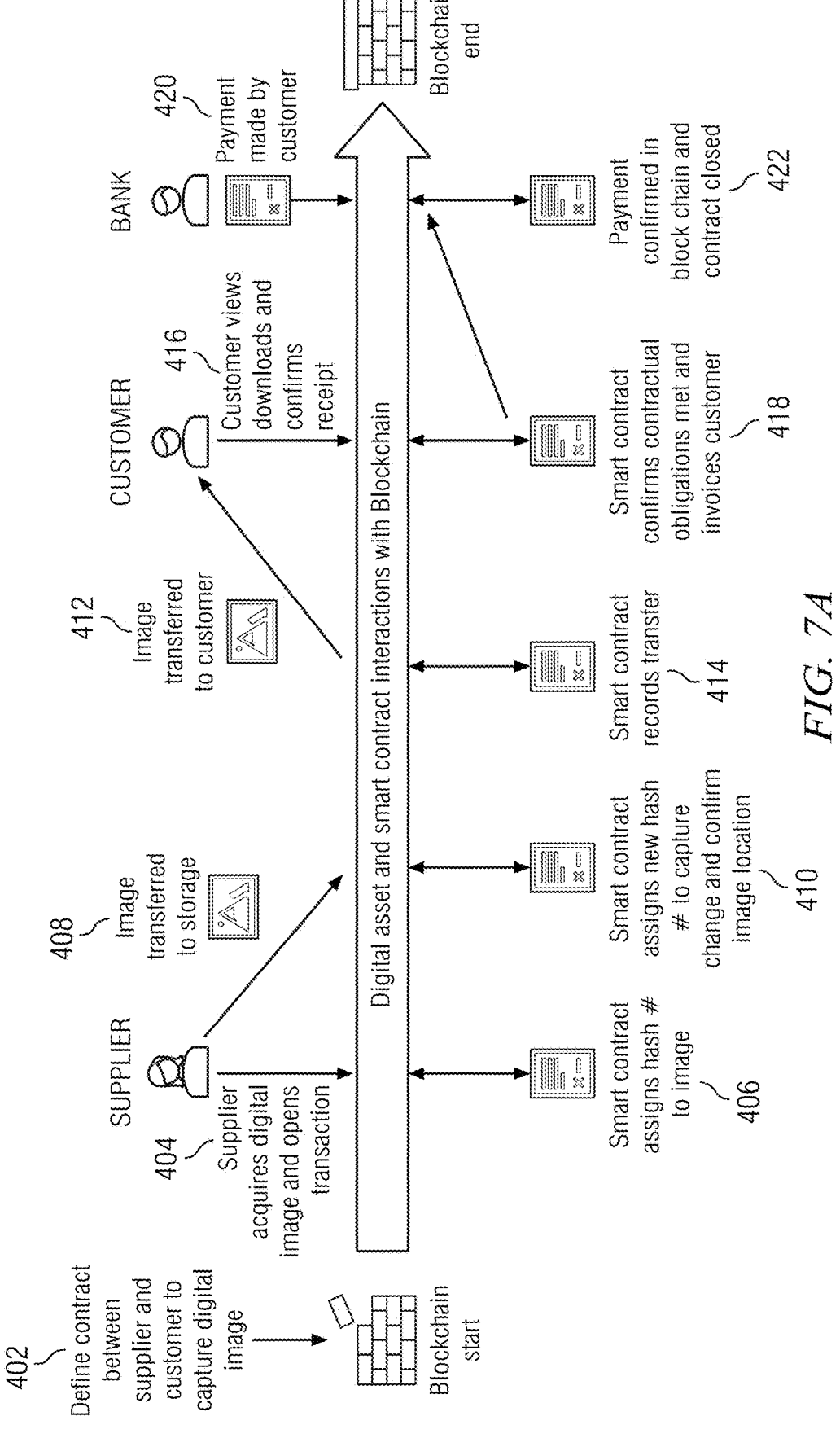
FIGS. 7A-7D (collectively FIG. 7) depict example high level workflows for digital image acquisition and transfer (7A), digital image customer access (7B), digital image sale or liquidation (7C), and digital image micro invoicing (7D).

In FIG. 7A, a contract may be defined between the supplier and the customer to capture one or more digital cuttings images to initiate the block chain at 402. The supplier captures the digital cuttings image at 404. A unique smart chain contract is validated for each image at 406 with a corresponding hash # applied to the digital asset (image). The digital cuttings image is transferred to storage at 408

(e.g., networked short-term or long-term storage as described above). The smart contract assigns a new hash # to the image at 410 to capture and confirm the storage location of the digital asset. The digital image may be transferred to the customer at 412 with the smart contract recording the transfer in the block chain ledger at 414. The customer may view the downloads and thereby confirm receipt of the image at 416. The smart contract may correspondingly confirm that the microtransaction has been executed and that conditions have been successfully met (e.g., that the image has been successfully transferred and received) at 418. The smart contract may further invoice the customer at 418. Payment may be made and received at 420 and confirmed in the block chain ledger at 422. The contract may be closed out at 422 with the conditions for digital cuttings image capture having been met.

With further reference to FIG. 7A, the smart chain contract between the supplier and the customer is related to the acquisition of a digital cuttings image by the supplier and transfer of that image to the customer. The contract is open upon capture of the image by the supplier and settled when the image transfer has been confirmed in the block chain ledger. The ledger may record various events and outcomes within the contract term, for example, including validation of image capture, validation of image storage, confirmation of image transfer, validation that contractual obligations have been met, and confirmation of payment from the customer to the supplier.

Figure 7B:
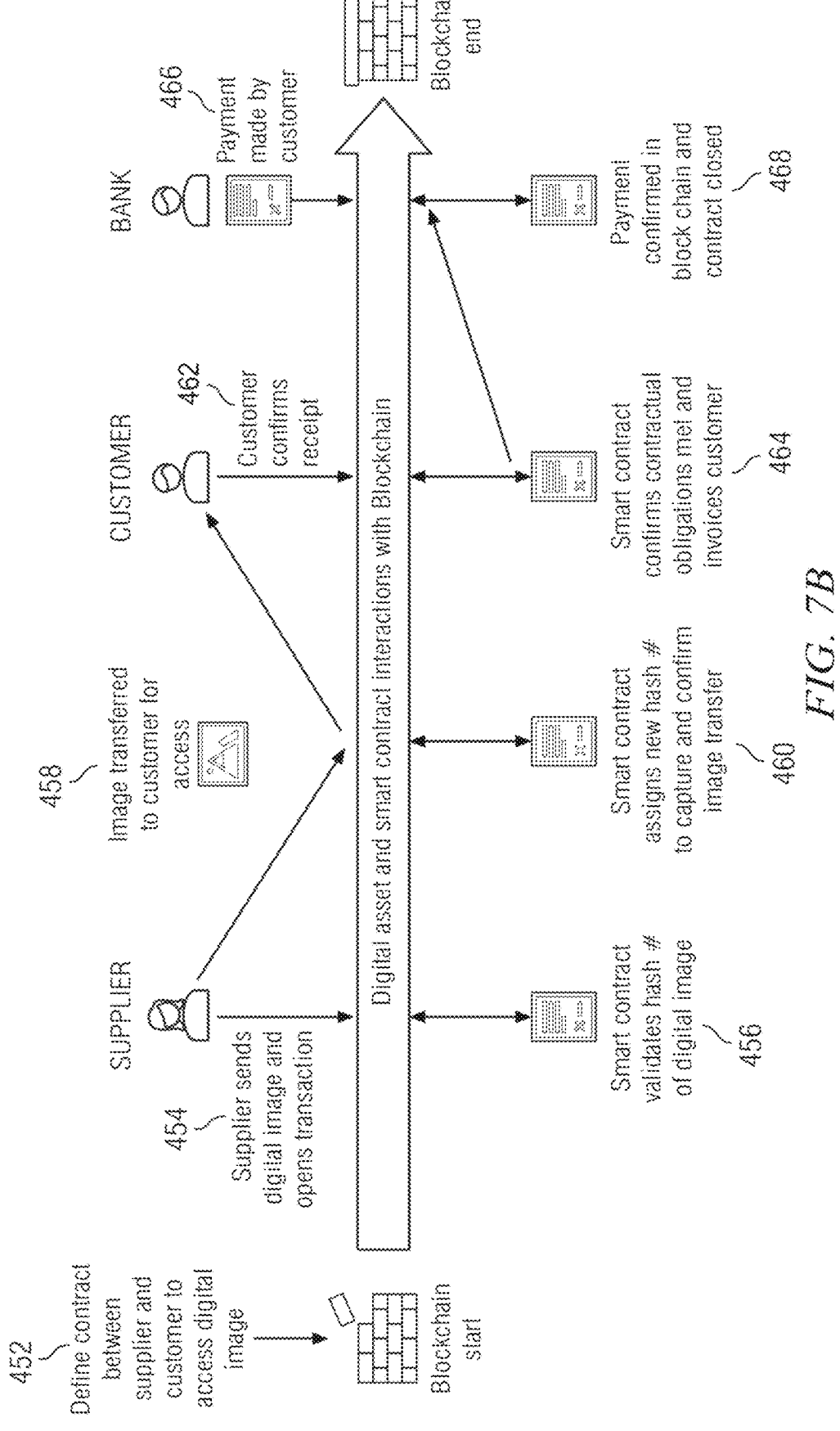

In FIG. 7B, a contract may be defined between the supplier and the customer to provide access to one or more digital cuttings images to initiate the block chain at 452. The supplier makes the digital cutting image available at 454, for example, via providing access to the customer to a storage folder. A unique smart chain contract is validated for each image at 456 with a corresponding hash # applied to the digital asset (image). The digital cuttings image is transferred to the customer at 458 (e.g., transferred to a networked customer database). The smart contract assigns a new hash # to the image at 460 to capture and confirm the new storage location of the digital asset. The customer confirms receipt of the digital image(s) at 462 and the smart contract confirms that the image has been transferred successfully and that the contractual conditions have been met at 464. A micro invoice may also be initiated at 464. Payment may be made and received at 466 and confirmed in the block chain ledger at 468. The contract may be closed out at 468 with the conditions for digital cuttings image access having been met.

With further reference to FIG. 7B, the contract between the supplier and the customer is related to customer access to previously acquired images. The contract may be open when the image is made available by the supplier and may be settled when the image has been accessed by the customer or when the supplier removes the ability to access the image. The ledger may record various events and outcomes within the contract term, for example, including validation of image availability, confirmation of customer access, and confirmation of payment from the customer to the supplier for individual or collective access events.

Figure 7C:
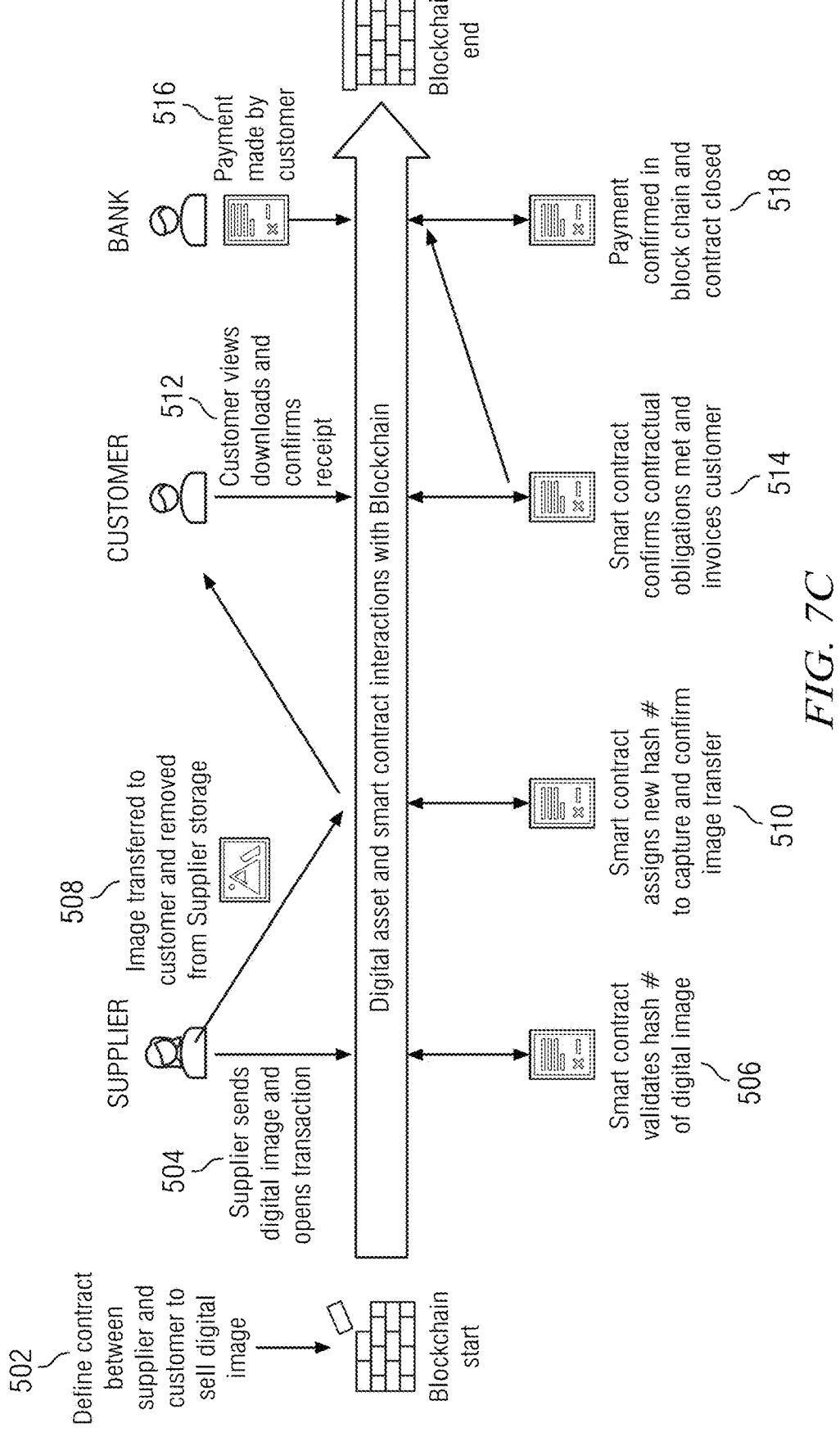

In FIG. 7C, a contract may be defined between the supplier and the customer for the supplier to sell one or more digital cuttings images to the customer to initiate the block chain at 502. The supplier identifies the sold images at 504 and a unique smart chain contract is validated for each image at 506 with a corresponding hash # applied to the digital asset. The digital cuttings image is transferred to the customer and removed from supplier storage at 508. The smart contract assigns a new hash # to the image at 510 to capture and confirm the new storage location of the digital asset. The customer may view the image and thereby confirm receipt of the digital image(s) at 512. The smart contract may correspondingly confirm that the microtransaction has been executed and that the image has been transferred successfully and that the contractual conditions have been met at 514. A micro invoice may also be initiated at 514. Payment may be made and received at 516 and confirmed in the block chain ledger at 518. The contract may be closed out at 518 with the conditions for digital cuttings image access having been met. It will be appreciated that removal of the image from supplier storage may occur after payment receipt has been confirmed, rather than at the time of image transfer to the customer. The disclosed embodiments are not limited in this regard.

With further reference to FIG. 7C, the contract between the supplier and the customer is related to the sale a digital cuttings image by the supplier to the customer. The contract is open upon agreement between the supplier and the customer and settled when final payment has been received and the image has been purged (or liquidated) from the supplier database. The ledger may record various events and outcomes within the contract term, for example, including validation that the images were sent by the supplier and received by the customer, that payment has been received, and that the images have been removed from the supplier database.

Figure 7D:
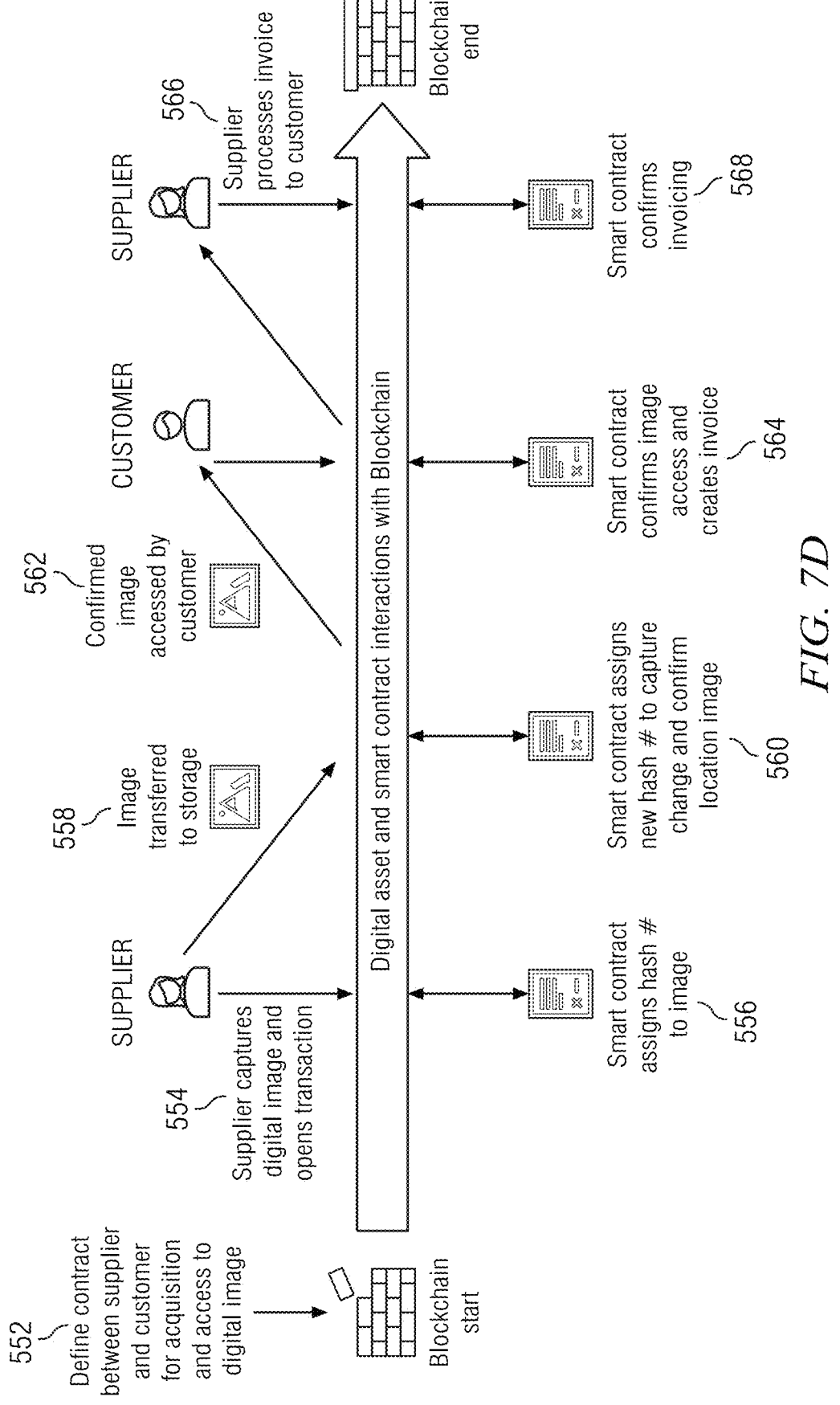

In FIG. 7D, a contract may be defined between the supplier and the customer for the supplier to capture one or more digital cuttings images to the customer to initiate the block chain at 552. The supplier captures the digital cuttings image at 554. A unique smart chain contract is validated for each image at 556 with a corresponding hash # applied to the digital asset. The digital cuttings image is transferred to storage at 558 (e.g., networked short-term or long-term storage as described above). The smart contract assigns a new hash # to the image at 560 to capture and confirm the storage location of the digital asset. The digital asset may be accessed (e.g., downloaded, evaluated, or modified) the microtransaction thereby confirmed at 562. The smart contract may correspondingly confirm that the image has been accessed in customer storage at 564. A corresponding micro invoice may also be updated and/or created at 564 upon confirmation of the image access. The micro invoice may be directly transferred to the customer or combined with other micro invoices and then transferred to the customer at 566. Confirmation of invoicing may be recorded in the block ledger at 568.

With further reference to FIG. 7D, the contract between the supplier and the customer is related to supplier acquisition and customer access cuttings images and to the corresponding micro invoicing. The contract is open upon agreement between the supplier and the customer. In FIG. 7D, the contract remains open as image access events the corresponding invoicing may be ongoing. The ledger may record various events and outcomes within the contract term, for example, acquisition of the image, transfer of the image to storage, customer access to image, and invoicing creation and confirmation. Moreover, the ledger may advantageously show invoicing events to the customer without providing access to the supplier invoicing system and other financial systems.

It will be understood that the present disclosure includes numerous embodiments. These embodiments include, but are not limited to, the following embodiments.

In a first embodiment, a digital image management system configured to manage and track digital images of drill cuttings acquired during subterranean drilling operations comprises at least one networked database configured to store the digital images; a supplier portal configured to enable a supplier to upload the digital images into the database; a customer portal configured to provide customer access to selected ones of the digital images in the database; and a networked blockchain ledger in communication with the database, the supplier portal, and the customer portal, wherein the blockchain ledger is configured to initiate a smart chain contract for each of the digital images, record customer access events within each smart chain contract for each of the digital images, and create a micro invoice including charges related to the recorded customer access events.

A second embodiment may include the first embodiment, wherein the networked block chain ledger is further configured to record a unique storage location for each of the digital images uploaded to the networked database.

A third embodiment may include the second embodiment, wherein the at least one database comprises a short-term storage database and a long-term storage database; and the block chain ledger is configured to update the recorded unique storage location of each of the digital images when transferred from the short-term storage database to the long-term storage database.

A fourth embodiment may include any one of the first through third embodiments, wherein the smart chain contract is further configured to confirm an authenticity of the uploaded digital images.

A fifth embodiment may include any one of the first through fourth embodiments, further comprising a digital image acquisition system, wherein the digital image acquisition system comprises a digital camera, a lens, at least one light source, and a controller in communication with the supplier portal.

A sixth embodiment may include any one of the first through fifth embodiments, wherein the customer access events comprise at least one of a low resolution download of one of the digital images, a high resolution download of one of the digital images, a download or a set of the digital images from a well section or a full well, a viewing event of one of the digital images, a use of image measurement tools in the supplier portal to evaluate one of the digital images, and a download of an interpretation of one of the digital images.

A seventh embodiment may include any one of the first through sixth embodiments, wherein the blockchain ledger is further configured to send requested ones of the digital images to the customer and to confirm receipt of each of the sent digital images.

An eighth embodiment may include any one of the first through seventh embodiments, wherein the blockchain ledger is further configured to send the micro invoices to the customer and to confirm that the sent micro invoices have been received by the customer; and confirm payment of the sent micro invoices and to close out the smart contract when the payment has been received.

A ninth embodiment may include any one of the first through eighth embodiments, wherein the block chain ledger is further configured to provide notification to the customer when a predefined percentage of a total contract invoice amount has been met.

A tenth embodiment may include any one of the first through ninth embodiments, wherein the block chain ledger is further configured to initiate a smart chain contract upon acquisition of each of the digital images; record a unique storage location for each of the digital images uploaded to the networked database; update the recorded unique storage location of each of the digital images when transferred from a short-term storage database to a long-term storage database; confirm an authenticity of each of the uploaded digital images; record customer access events within each smart chain contract for each of the digital images; create a micro invoice including charges related to the recorded customer access events; send the micro invoices to the customer; confirm that the sent micro invoices have been received by the customer; confirm payment of the sent micro invoices; and close out the smart contract when the payment has been received.

In an eleventh embodiment, a method for managing and tracking digital images of drill cuttings acquired during a subterranean drilling operation comprises acquiring a digital image of drill cuttings particles; initiating a smart contract corresponding to the acquired image and updating a blockchain ledger with a unique hash number corresponding to the acquired image; storing the digital image in a networked database; confirming the authenticity of the stored image with the smart chain contract and updating the block chain ledger with a unique storage location for the image; using the smart chain contract to record selected interactions with the stored image by a customer and updating the block chain ledger with corresponding transactional identifiers; and using the smart chain contract to create a micro invoice for the customer based on the recorded interactions with the stored image and updating the block chain ledger with a corresponding invoice identifier.

A twelfth embodiment may include the eleventh embodiment, wherein the acquiring the digital image comprises drilling a subterranean wellbore; collecting the cuttings particles from circulating drilling fluid; preparing the cuttings particles; and taking a calibrated digital photograph of the prepared cuttings particles.

A thirteenth embodiment may include any one of the eleventh through twelfth embodiments wherein, the acquiring the digital image comprises acquiring a first white light digital image and a second ultraviolet digital image.

A fourteenth embodiment may include any one of the eleventh through thirteenth embodiments, wherein the storing the digital image further comprises storing the digital image in a short-term database; transferring the digital image from the short-term database to a long-term database; and wherein the block chain ledger is configured to update the recorded unique storage location of each of the digital images when transferred from the short-term database to the long-term database.

A fifteenth embodiment may include any one of the eleventh through fourteenth embodiments, wherein the selected interactions with the stored image comprise at least one of a low resolution download of one of the digital images, a high resolution download of one of the digital images, a download or a set of the digital images from a well section or a full well, a viewing event of one of the digital images, a use of image measurement tools in the supplier portal to evaluate one of the digital images, and a download of an interpretation of one of the digital images.

A sixteenth embodiment may include any one of the eleventh through fifteenth embodiments, further comprising sending the digital image to the customer and confirming receipt of the digital image by the customer.

A seventeenth embodiment may include any one of the eleventh through sixteenth embodiments, further comprising confirming that the micro invoice has been received by the customer; and confirming that the micro invoice has been paid by the customer.

An eighteenth embodiment may include any one of the eleventh through seventeenth embodiments, further comprising closing out the smart contract when the micro invoice has been paid by the customer.

A nineteenth embodiment may include any one of the eleventh through eighteenth embodiments, further comprising a notification to the customer when a predefined percentage of a total contract invoice amount has been met.

A twentieth embodiment may include any one of the eleventh through nineteenth embodiments, further comprising sending the digital image to the customer; confirming receipt of the sent digital image by the customer; confirming that the micro invoice has been received by the customer; confirming that the micro invoice has been paid by the customer; closing out the smart contract when the micro invoice has been paid by the customer; and providing a notification to the customer when a predefined percentage of a total contract invoice amount has been met.

Although digital image management of drill cuttings images has been described in detail, it should be understood that various changes, substitutions and alternations can be made herein without departing from the spirit and scope of the disclosure as defined by the appended claims.

The invention claimed is:

1. A digital image management system configured to manage and track digital images of drill cuttings acquired during subterranean drilling operations, the system comprising:

at least one networked database configured to store the digital images;

a supplier portal configured to enable a supplier to upload the digital images into the at least one networked database;

a customer portal configured to provide a customer access to selected images of the digital images in the at least one networked database; and a blockchain ledger system comprising a networked blockchain ledger in communication with the at least one networked database, the supplier portal, and the customer portal, wherein the blockchain ledger system is configured to:

initiate a smart chain contract for a respective selected image of the digital images;

update the networked blockchain ledger with a unique hash number generated as corresponding to the respective selected image of the digital images;

assign a first new hash number to the respective selected image of the digital images based on a unique storage location upon transfer of the respective selected image to the unique storage location;

record one or more customer access events within the smart chain contract for the respective selected image of the digital images, wherein the one or more customer access events comprise at least one of a download of the selected image, a viewing event of the selected image, a use of image measurement tools in the supplier portal to evaluate the selected image, or a download of a lithological interpretation of the selected image;

add one or more unique transactional identifiers to the networked blockchain ledger corresponding to the one or more customer access events; and close out the smart chain contract.

2. The system of claim 1, wherein:

the blockchain ledger system is configured to update the first new hash number associated with the unique storage location of the respective selected image of the digital images when the selected image of the digital images is transferred from a short-term storage database to a long-term storage database.

3. The system of claim 1, wherein the smart chain contract is configured to confirm an authenticity of the digital images.

4. The system of claim 1, further comprising a digital image acquisition system, wherein the digital image acquisition system comprises a digital camera, a lens deployed above a drill cuttings sample holder and configured to take a digital photograph of a drill cuttings sample, at least one light source configured to illuminate the drill cuttings sample holder, and a controller in communication with the supplier portal and configured to control operation of the digital camera, the lens, the at least one light source, or any combination thereof.

5. The system of claim 1, wherein the blockchain ledger system is further configured to send requested digital images of the digital images to the customer and to confirm receipt of each of the requested digital images of the digital images.

6. The system of claim 1, wherein the blockchain ledger system is further configured to:

send one or more micro invoices based on the customer access events to the customer and to confirm that the one or more micro invoices have been received by the customer; and confirm payment of the one or more micro invoices and to close out the smart chain contract when the payment has been received.

7. The system of claim 1, wherein the blockchain ledger system is further configured to provide notification to the customer when a predefined percentage of a total contract invoice amount has been met.

8. A method for managing and tracking digital images of drill cuttings acquired during a subterranean drilling operation, the method comprising:

acquiring a digital image of drill cuttings particles;

using a blockchain ledger system comprising a networked blockchain ledger in communication with at least one networked database, a supplier portal, and a customer portal to initiate a smart chain contract corresponding to the digital image and to update the networked blockchain ledger with a unique hash number generated as corresponding to the digital image;

storing the digital image in the at least one networked database;

using the blockchain ledger system to assign a first new hash number to the digital image based on a unique storage location upon transfer of the digital image to the unique storage location;

using the blockchain ledger system to record selected interactions with the digital image by a customer to update the networked blockchain ledger with corresponding transactional identifiers, wherein the selected interactions comprise at least one of a download of the digital image, a viewing event of the digital image, a use of image measurement tools in a supplier portal to evaluate the digital image, or a download of a lithological interpretation of the digital image; and closing out the smart chain contract.

9. The method of claim 8, wherein the acquiring the digital image comprises:

drilling a subterranean wellbore;

collecting the cuttings particles from circulating drilling fluid;

preparing the cuttings particles; and taking a calibrated digital photograph of the cuttings particles.

10. The method of claim 8, wherein the acquiring the digital image comprises acquiring a first white light digital image and a second ultraviolet digital image.

11. The method of claim 8, wherein the storing the digital image further comprises:

storing the digital image in a short-term database;

transferring the digital image from the short-term database to a long-term database; and wherein the blockchain ledger system is configured to update the first new hash number associated with the unique storage location of the digital image when the digital image is transferred from the short-term database to the long-term database.

12. The method of claim 8, further comprising sending the digital image to the customer and confirming receipt of the digital image by the customer.

13. The method of claim 8, further comprising:

using the smart chain contract to create a micro invoice for the customer based on the selected interactions with the digital image and updating the networked blockchain ledger with a corresponding invoice identifier;

confirming that the micro invoice has been received by the customer; and confirming that the micro invoice has been paid by the customer.

14. The method of claim 13, wherein closing out the smart chain contract occurs in response to payment of the micro invoice by the customer.

15. The method of claim 13, further comprising providing a notification to the customer when a predefined percentage of a total contract invoice amount has been met.

16. The method of claim 8, further comprising:

sending the digital image to the customer;

confirming receipt of the digital image by the customer;

generating a micro invoice for the customer using the smart chain contract based on the selected interactions with the digital image and updating the networked blockchain ledger with a corresponding invoice identifier;

confirming that the micro invoice has been received by the customer;

confirming that the micro invoice has been paid by the customer;

closing out the smart chain contract in response to payment of the micro invoice by the customer; and providing a notification to the customer when a predefined percentage of a total contract invoice amount has been met.

17. The system of claim 1, wherein the digital images of the drill cuttings are acquired by a process comprising:

drilling a subterranean wellbore;

collecting the drill cuttings from circulating drill fluid;

preparing the drill cuttings for analysis; and taking a calibrated digital photograph of the drill cuttings.

18. The system of claim 17, wherein the calibrated digital photograph of the drill cuttings comprises:

a white light image generated via a sample holder holding the drill cuttings and illumination of the drill cuttings by a white light source;

an ultraviolet image generated via the sample holder holding the drill cuttings and illumination of the drill cuttings by an ultraviolet light source; or a composite image generated via the sample holder holding the drill cuttings and illumination of the drill cuttings by both the white light source and the ultraviolet light source.

19. The system of claim 17, wherein the circulating drill fluid is configured to carry drill cuttings in an upward flow to a surface.

20. The system of claim 17, wherein the drill cuttings are removed from the circulating drill fluid and into a return conduit by a shale shaker.

\* \* \* \* \*